United States Patent
Tao

(10) Patent No.: US 10,931,502 B2
(45) Date of Patent: Feb. 23, 2021

(54) COMMUNICATION METHOD AND APPARATUS BASED ON RELAY DEVICE, AND COMMUNICATION METHOD AND APPARATUS BETWEEN TERMINAL AND BASE STATION

(71) Applicant: ALIBABA GROUP HOLDING LIMITED, Grand Cayman (KY)

(72) Inventor: Zhen Tao, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 16/428,607

(22) Filed: May 31, 2019

(65) Prior Publication Data

US 2019/0372820 A1    Dec. 5, 2019

(30) Foreign Application Priority Data

May 31, 2018  (CN) .......................... 2018 1 0549999

(51) Int. Cl.
*H04W 4/00* (2018.01)
*H04L 27/26* (2006.01)
(Continued)

(52) U.S. Cl.
CPC ..... *H04L 27/2692* (2013.01); *H04W 52/0216* (2013.01); *H04W 56/0015* (2013.01);
(Continued)

(58) Field of Classification Search
CPC ............ H04L 27/2692; H04L 27/2656; H04L 27/261; H04W 56/0015; H04W 56/0045;
(Continued)

(56) References Cited

U.S. PATENT DOCUMENTS

2010/0278128 A1   11/2010  Lee et al.
2011/0261749 A1*  10/2011  Youn ..................... H04L 5/0007
                                                                370/315
(Continued)

FOREIGN PATENT DOCUMENTS

CA            3019646 A1   10/2017
WO    WO 2013112952 A1    8/2013

OTHER PUBLICATIONS

PCT International Search Report and Written Opinion of the International Searching Authority issued in corresponding International Application No. PCT/US19/34843, dated Sep. 24, 2019 (12 pages).

*Primary Examiner* — Chuong T Ho

(74) *Attorney, Agent, or Firm* — Finnegan, Henderson, Farabow, Garrett & Dunner, LLP

(57) ABSTRACT

The present application discloses a communication method performed by a relay device. The method includes: receiving a first uplink data frame from a terminal, the first uplink data frame comprising information indicating a first period; determining a length of a first preamble according to the first period and a first time length, the first time length being equal to a length of a third preamble plus a second time length; sending a second downlink data frame to the terminal, the second downlink data frame comprising the first preamble; and receiving a first downlink data frame from a base station, the first downlink data frame comprising a second preamble, wherein a length of the second preamble is less than or equal to each of the length of the first preamble and the length of the third preamble.

12 Claims, 10 Drawing Sheets

(51) Int. Cl.
*H04W 56/00* (2009.01)
*H04W 72/12* (2009.01)
*H04W 52/02* (2009.01)
*H04W 88/04* (2009.01)

(52) U.S. Cl.
CPC ... *H04W 56/0045* (2013.01); *H04W 72/1273* (2013.01); *H04W 72/1284* (2013.01); *H04W 88/04* (2013.01)

(58) Field of Classification Search
CPC ......... H04W 72/1284; H04W 52/0216; H04W 72/1273; H04W 88/04; H04W 52/0229; H04W 72/042; H04W 72/0413; H04B 7/15528
USPC .......................................... 370/329, 330, 311
See application file for complete search history.

(56) References Cited

U.S. PATENT DOCUMENTS

| | | | |
|---|---|---|---|
| 2017/0013470 A1* | 1/2017 | Sun ..................... | H04W 16/14 |
| 2017/0280438 A1* | 9/2017 | Balachandran ......... | H04W 4/06 |
| 2018/0041318 A1* | 2/2018 | Sudo ................... | H04L 27/2613 |
| 2018/0063801 A1* | 3/2018 | Lu ..................... | H04W 74/0833 |

* cited by examiner

US 10,931,502 B2

COMMUNICATION METHOD AND APPARATUS BASED ON RELAY DEVICE, AND COMMUNICATION METHOD AND APPARATUS BETWEEN TERMINAL AND BASE STATION

CROSS REFERENCE TO RELATED APPLICATION

The disclosure claims the benefits of priority to Chinese application number 201810549999.3, filed May 31, 2018, which is incorporated herein by reference in its entirety.

BACKGROUND

The Internet-of-things technology is the third information technology revolution after the computer technology and the Internet. The Internet-of-things technology has features and advantages of real-time performance and interactivity, and has been widely used in fields such as urban management, digital homes, positioning and navigation, logistics management, and security systems. Long Range Radio (LoRa) is an ultra-long-distance transmission technology based on the spread-spectrum technology in the Internet-of-things. LoRa has features of long transmission distances, low power consumption, multiple nodes, and low cost.

In conventional data transmission methods, a LoRa network system generally includes a terminal, a base station, and a server.

The LoRa terminal has several working modes, one of which is a Class B mode. In general, an uplink signal of the terminal in Class B mode is directly received by a base station, and a downlink signal of the base station may also be directly received by the terminal in Class B mode. However, in some cases, signals from the base station and the terminal cannot arrive at their counterparts due to attenuation. For example, if a Class B mode terminal is installed underground, the signal strength may be attenuated, making communication between the base station and the Class B mode terminal impossible. Another reason why the base station or the Class B mode terminal may not receive the data of its counterpart is that the deployment distance is too far to receive the data.

SUMMARY OF THE DISCLOSURE

In view of the foregoing problems, embodiments of this application are proposed to provide a communication method based on a relay device, a communication method between a terminal and a base station, a communication apparatus, and a communication apparatus between a terminal and a base station that address or at least partially solve the foregoing problems.

Embodiments of the disclosure provide a communication method performed by a relay device. The method can include: receiving a first uplink data frame from a terminal, the first uplink data frame comprising information indicating a first period; determining a length of a first preamble according to the first period and a first time length, the first time length being equal to a length of a third preamble plus a second time length, wherein the determining of the length of the first preamble comprises: in response to the first period being determined to be greater than the first time length, setting the length of the first preamble to be the length of the third preamble; or in response to the first period being determined to be less than or equal to the first time length, setting the length of the first preamble to be a third time length, the third time length being equal to the first period minus the second time length; sending a second downlink data frame to the terminal, the second downlink data frame comprising the first preamble; and receiving a first downlink data frame from a base station, the first downlink data frame comprising a second preamble, wherein a length of the second preamble is less than or equal to each of the length of the first preamble and the length of the third preamble.

Embodiments of the disclosure further provide a communication method performed by a terminal. The method can include: sending a first uplink data frame to a relay device, the first uplink data frame comprising a fourth preamble and information indicating a first period; and receiving a second downlink data frame from the relay device, the second downlink data frame comprising a first preamble, wherein the first period is used by the relay device to determine a length of the first preamble: the length of the first preamble being equal to a length of a third preamble if the first period is greater than a first time length, the first time length being equal to the length of the third preamble plus a second time length, and the length of the first preamble being equal to a third time length if the first period being less than or equal to the first time length, the third time length being equal to the first period minus the second time length.

Embodiments of the disclosure also provide a communication method performed by a relay device. The method can include: receiving a first beacon frame from a base station, the first beacon frame comprising a first synchronization time; in response to a fifth time length having passed after the first beacon frame is received by the relay device, sending a second beacon frame to a terminal, the second beacon frame comprising a second synchronization time, the second synchronization time being equal to the first synchronization time plus a fourth time length, the fifth time length information being equal to the fourth time length minus a time length for beacon frame transmission; receiving a first downlink data frame from the base station; and in response to the fourth time length having passed after the first downlink data frame is received by the relay device, sending the first downlink data frame to the terminal.

Embodiments of the disclosure also provide a communication method performed by a relay device. The method can include: receiving a first beacon frame from a base station, the first beacon frame comprising a first synchronization time; in response to a fifth time length having passed after the first beacon frame is received by the relay device, sending a second beacon frame to a terminal, the second beacon frame comprising a second synchronization time, the second synchronization time being equal to the first synchronization time plus a fourth time length, the fifth time length information being equal to the fourth time length minus a time length for beacon frame transmission; receiving a first downlink data frame from the base station; and in response to the fourth time length having passed after the first downlink data frame is received by the relay device, sending the first downlink data frame to the terminal.

Embodiments of the disclosure also provide a relay device. The relay device can include: at least one processor; and a memory storing a set of instructions that is executable by the at least one processor to cause the relay device to perform: receiving a first uplink data frame from a terminal, the first uplink data frame comprising information indicating a first period; determining a length of a first preamble according to the first period and a first time length, the first time length being equal to a length of a third preamble plus a second time length, wherein the determining of the length of the first preamble comprises: in response to the first period being determined to be greater than the first time length, setting the length of the first preamble to be the length of the third preamble; or in response to the first period being determined to be less than or equal to the first time length, setting the length of the first preamble to be a third time length, the third time length being equal to the first period minus the second time length; sending a second downlink data frame to the terminal, the second downlink data frame comprising the first preamble; and receiving a first downlink data frame from a base station, the first downlink data frame comprising a second preamble, wherein a length of the second preamble is less than or equal to each of the length of the first preamble and the length of the third preamble.

Embodiments of the disclosure also provide a terminal. The terminal can include: at least one processor; and a memory storing a set of instructions that is executable by the at least one processor to cause the terminal to perform: sending a first uplink data frame to a relay device, the first uplink data frame comprising a fourth preamble and information indicating a first period; and receiving a second downlink data frame from the relay device, the second downlink data frame comprising a first preamble, wherein the first period is used by the relay device to determine a length of the first preamble: the length of the first preamble being equal to a length of a third preamble if the first period is greater than a first time length, the first time length being equal to the length of the third preamble plus a second time length, and the length of the first preamble being equal to a third time length if the first period being less than or equal to the first time length, the third time length being equal to the first period minus the second time length.

Embodiments of the disclosure also provide a relay device. The relay device can include: at least one processor; and a memory storing a set of instructions that is executable by the at least one processor to cause the relay device to perform: receiving a first beacon frame from a base station, wherein the first beacon frame comprises first synchronization time information; sending a second beacon frame to a terminal after the first beacon frame is received and fifth time length information passes, wherein the second beacon frame comprises second synchronization time information, the second synchronization time information is the first synchronization time information plus fourth time length information, and the fifth time length information is the fourth time length information minus beacon frame transmission time length information; receiving a first downlink data frame sent by the base station; and sending the first downlink data frame to the terminal after the first downlink data frame is received and the fourth time length information passes.

Embodiments of the disclosure also provide a terminal. The terminal can include: at least one processor; and a memory storing a set of instructions that is executable by the at least one processor to cause the terminal to perform: receiving a second beacon frame from a relay device when a fifth time length has passed after a first beacon frame is received by relay device from a base station, the second beacon frame comprising information indicating a second synchronization time, the second synchronization time being equal to a first synchronization time plus a fourth time length, information indicating the first synchronization time being included in the first beacon frame; and receiving a first downlink data frame from the relay device when the fourth time length has passed after the first downlink data frame is received by the relay device from the base station.

DETAILED DESCRIPTION

Figure 1:
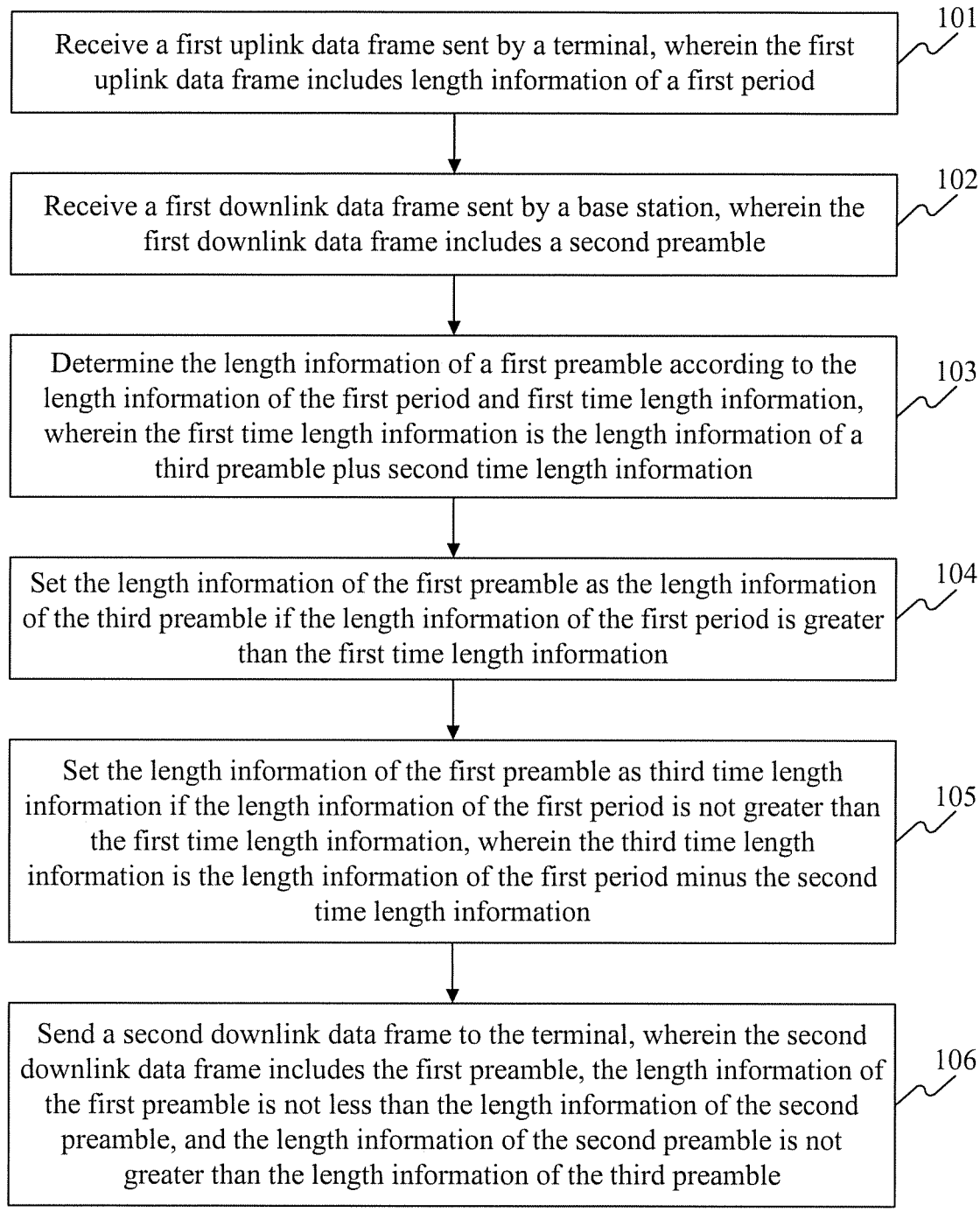
FIG. 1 is a flowchart of a communication method performed by a relay device in a communication system, according to exemplary embodiments of the disclosure.

To enable the foregoing objectives, features, and advantages of this application to be more comprehensible, this application is described in the following in further detail with reference to the accompanying drawings and specific implementation manners.

A LoRa network includes a terminal node, a base station node (also known as "gateway"), and a server. The terminal may be connected to a LoRa network. Depending on the application scenarios where the LoRa network is deployed, the terminal may include a variety of electronic devices. For example, the terminal may include an electricity meter when the LoRa network is used for urban management. As another example, the terminal may include a variety of intelligent household appliances when the LoRa network is used for a digital home.

LoRa terminals may have several working modes, such as a Class A mode, a Class B mode, and a Class C mode.

A terminal in Class A mode may report data on demand, according to an ALOHA protocol. The ALOHA protocol is a networking protocol that can establish a wireless data network. According to the ALOHA protocol, each uplink is followed by two transitory downlink reception slots to achieve a two-way transmission. This operation can be power saving. The slot can also be referred to as a window.

A Class B mode terminal allows more reception slots. The Class B mode terminal may open a reception slot within a foreseeable period of time, other than the reception slots provided after a random uplink of the terminal in Class A mode. The slot can be referred to as a ping slot. A downlink data frame sent by the server in the reception slot can be referred to as a ping frame. In order to enable the terminal to open the reception slot at a given time, the terminal may receive a time-synchronized beacon frame from the base station. Thus, the server can know moments of all the reception slots of the terminal device.

A terminal in Class C mode generally opens the reception slot all the time and only closes it temporarily at the time of sending. Therefore, the terminal consumes more power operating in Class C mode than operating in Class A mode or Class B mode.

The base station, also referred to as a gateway or concentrator in the LoRa network, has a wireless connection aggregation function. The wireless connection aggregation function can provide the terminal with a port for connecting to the LoRa network, forwarding data from the server or terminal, and implementing data interaction between the terminal and the server. The base station can also carry out data interaction with other base stations in the signal coverage of the base station by transmitting wireless frames.

The server may include a server or a cluster of servers, configured to process services based on data acquired from the base station or the terminal and control the working mode and the working status of the base station or the terminal.

One of core ideas of embodiments of this application is to deploy a relay device in Class B mode between the terminal and the base station, and establish communication between the terminal and the base station through a LoRa relay device in Class B mode. The relay device may also choose, in accordance with the LoRa protocol, one of Class A mode, Class B mode, and Class C mode. In embodiments of this application, the relay device can save more power when it is in Class B mode than in Class C mode. It is appreciated that a relay device can also be referred to as a repeater.

A communication process after the terminal is connected to the network will be introduced from the perspective of the relay device, as below.

FIG. 1 is a flowchart of a communication method 100 performed by a relay device, according to embodiments of the disclosure. Consistent with the disclosed embodiments, the relay device may be used to facilitate communication between a terminal and a base station. Referring to FIG. 1, method 100 may include steps as below.

In step 101, a relay device can receive a first uplink data frame sent by the terminal. The first uplink data frame can include length information of a first period. The first period refers to a period during which the base station sends a first downlink data frame at a foreseeable time as agreed between the terminal operating in Class B mode and the base station.

In embodiments of the disclosure, both of the relay device and the terminal may operate in Class B mode.

After being connected to the network, the terminal may send a first uplink data frame to the relay device. The first uplink data frame may include the length information of a first period. The first uplink data frame may include a ping slot information request (PingSlotInfoReq) command, which has three bits of periodicity information. The length information of the first period may be included in the ping slot information request command. The base station opens a time slot periodically according to the first period and sends the first downlink data frame in the time slot. The time slot is referred to as a ping slot In embodiments of the disclosure, the length information may be a time length.

In embodiments of the disclosure, the first uplink data frame may further include a first mode identifier. In method 100, the relay device may determine, according to the first mode identifier, that the terminal is operating in a first mode.

The first mode can be Class B mode, and the first mode identifier can be a Class B mode identifier. After receiving the first uplink data frame, the relay device may determine according to the first mode identifier that the terminal is operating in the first mode. The first mode identifier (e.g., the Class B mode identifier) can be a bit identifier in a frame control byte (FCtrl) of a frame header (FHDR). If the value of the Class B identifier is set to 1, it indicates that the terminal is in the first mode (e.g., Class B mode).

In embodiments of the disclosure, step 101 may include: waking the relay device periodically from a sleeping state according to a third period, and detecting whether a fourth preamble is received at the time of the waking. And the relay device can receive the first uplink data frame if the fourth preamble is detected.

In embodiments of the disclosure, the fourth preamble is a long preamble. The long preamble is relative to a standard preamble. The standard preamble is a preamble in a standard format specified according to a LoRaWAN protocol. The long preamble refers to a preamble with more symbols than the standard preamble given a same spreading factor. For example, when the spreading factor is 10, the number of symbols of the long preamble can be greater than 252. The long preamble may be configured to wake up the relay device. Similarly, the long preamble may also be configured to wake up the terminal.

The length of the preamble may include a time length. The standard preamble includes a fixed number of symbols, and has a shorter total time length.

To save power, a relay device and a terminal operating in Class B mode can be put in an intermittent sleeping state. The third period is a terminal waking period, referring to a period during which the terminal is woken up regularly and sends a first uplink data frame. The terminal may be woken up periodically according to the third period, and send the first uplink data frame at the time of wake-up. The relay device may also be woken up periodically according to the third period, and receive the first uplink data frame at the time of wake-up. The length of the third period may be determined according to the actual power saving requirements of the relay device.

In embodiments of the disclosure, the length of the fourth preamble is greater than or equal to that of the third period. The fourth preamble can activate a sleeping wireless receiver. For example, if the sleeping period of the receiver is four seconds, the length of the fourth preamble can be greater than or equal to four seconds. In some embodiments, only the first uplink data frame can include the fourth preamble.

In some embodiments, the method may further include: receiving, by the relay device, a first beacon frame sent by the base station, wherein the first beacon frame is configured for time correction.

A terminal operating in Class B mode can be time-synchronized with the base station through a beacon frame. First, the base station sends a first beacon frame to the relay device. The first beacon frame includes first synchronization time information. After receiving the first beacon frame, the relay device may correct its own system time by using the first time information.

In some embodiments, the step of receiving the first beacon frame sent by the base station may include: waking the relay device periodically from the sleeping state according to a second period, and receiving, at the time of the wakeup, the first beacon frame sent by the base station.

The second period refers to a period for receiving and transmitting beacon frames, as agreed between a terminal operating in Class B mode and a base station. The base station may send a first beacon frame periodically according to the second period, and the relay device may be woken up periodically from the sleeping state according to the second period and receive the first beacon frame at the time of wakeup.

In some embodiments, the method may further include: sending, by the relay device, a second uplink data frame to the base station; receiving, by the relay device, a third downlink data frame sent by the base station; and sending, by the relay device, the third downlink data frame to the terminal. The second uplink data frame includes a second preamble.

In some embodiments, the relay device may send a second uplink data frame to the base station according to the first uplink data frame. The first uplink data frame may include a fourth preamble. The relay device may replace the fourth preamble in the first uplink data frame with a second preamble to obtain the second uplink data frame. The second preamble refers to a standard preamble, and thus the length of the fourth preamble is greater than that of the second preamble.

After receiving the second uplink data frame, the base station sends the third downlink data frame to the relay device. The relay device may receive, in first mode, the third downlink data frame sent by the base station. Then the relay device may send the third downlink data frame to the terminal in the first mode.

In some embodiments, when the terminal sends a first uplink data frame, it can open two time slots, including a first reception slot (RX1) and a second reception slot (RX2).

When the relay device sends a second uplink data frame to the base station, the relay device can determine whether the terminal is in a preset first information set. And the relay device can send the second uplink data frame to the base station, if the terminal is in the preset first information set.

Terminal identifiers of a plurality of terminals are recorded in the first information set. The terminal identifiers may include Device Extended Unique Identifiers (DevEUIs). The first information set may be a first white list. The relay device extracts a terminal identifier from the second uplink data frame, then searches the first information set to see whether a terminal identifier corresponding to the extracted terminal identifier exists. If a terminal identifier corresponding to the extracted terminal identifier exists in the first information set, the relay device determines that the second uplink data frame of the terminal is allowed to be sent to the base station. In some embodiments, an information set has to be acquired using configuration or transmission that is not part of the LoRa transmission. The configuration or the transmission that is not part of the LoRa transmission can be referred to as an out-of-band method. Therefore, the relay device may acquire the first information set in the out-of-band method. The out-of-band method may be a factory setting of the relay device. The first information set may be preset in the relay device before leaving the factory.

In some embodiments, receiving, by the relay device, the third downlink data frame sent by the base station may include: receiving, within a first reception slot after the terminal sends the first uplink data frame, the third downlink data frame sent by the base station.

In some embodiments, sending, by the relay device, the third downlink data frame to the terminal may include: sending the third downlink data frame to the terminal within a second reception slot after the terminal sends the first uplink data frame.

In step 102, the relay device receives a first downlink data frame sent by a base station. The first downlink data frame includes a second preamble. The first downlink data frame refers to a downlink data frame sent by the base station in a foreseeable time slot, which is referred to as a ping frame.

Step 102 may further include: waking the relay device periodically from the sleeping state according to the first period, and receiving, at the time of wakeup, the first downlink data frame sent by the base station.

The first period is a period during which the base station sends the first downlink data frame.

In step 103, the relay device determines the length information of a first preamble according to the length information of the first period and first time length information. The first time length information is the length information of a third preamble plus second time length information.

In some embodiments, the first period may be a ping slot period (Ping-Slot Periodicity). The length information of the first period is the length information between the start time of one ping slot of the terminal to the start time of the next ping slot.

The first time length information is the sum of the length information of the third preamble and the length information of one ping slot.

The third preamble is a long preamble. The third preamble may be a default long preamble used in sending the second downlink data frame to the terminal by the relay device. For example, the length information of the third preamble may be set to two seconds (s).

The second time length information may be the length information of one ping slot. For example, if the length information of the ping slot is set to 30 microseconds (ms), the first time length information is 2 s+30 ms. That is, the sum of the length information of the third preamble and the length information of the ping slot.

In some embodiments, the method may further include: acquiring, by the relay device, the preset third preamble.

The third preamble can be preset in the relay device. The relay device may acquire the third preamble in an out-of-band method. The out-of-band method may be a factory setting of the relay device. The third preamble information may be preset in the relay device before leaving the factory.

In step 104, the relay device sets the length information of the first preamble as the length information of the third preamble, if the length information of the first period is greater than the first time length information. The first preamble is a long preamble and is a preamble in the second downlink data frame sent by the relay device.

If the length information of the ping slot period is greater than the sum of the length information of the third preamble and the length information of one ping slot, it indicates that the length information of the preamble of the second downlink data frame may be set as the length information of the third preamble. Such setting will not occupy the time length of the ping slot. This ensures that the terminal can be woken up by the long preamble and the ping slot will not be occupied by the preamble. This also ensures that the terminal can be accurately woken up from the sleeping state in power-saving mode and then receive the downlink data frame.

In some embodiment, when the length information of the ping slot period is greater than the sum of the length information of the third preamble and the length information of one ping slot, the relay device may also set the length information of the first preamble to a value greater than the length information of the third preamble. And, the sum of the length information of the first preamble and the length information of the ping slot is less than or equal to the length information of the first period.

In step 105, the relay device sets the length information of the first preamble as third time length information, if the length information of the first period is less than or equal to the first time length information. The third time length information is the length information of the first period minus the second time length information.

In some embodiments, if the length information of the ping slot period is less than or equal to the sum of the length information of the third preamble and the length information of one ping slot, it indicates that the time length of the ping slot will be occupied, when the length information of the first preamble is set as the length information of the third preamble. Therefore, in order to avoid such a problem, when the length information of the ping slot period is less than or equal to the sum of the length information of the third preamble and the time of one ping slot, the length information of the first preamble may be set as the length information of the third preamble minus the length information of the ping slot. This can ensure that the time length of the ping slot will not be occupied by the length set for the first preamble and that the terminal can receive the second downlink data frame through the ping slot.

In some embodiments, the second time length information is the length information of the ping slot. For example, the length information of the ping slot may be set to 30 ms. The length information of the third preamble is 2 s. Therefore, the first time length information is 2.03 s (2 s+30 ms).

If the length of the first period is greater than 2.03 s, the length of the first preamble is set to 2 s. If the length of the first period is not greater than 2.03 s, the length of the first preamble is set to the length of the first period minus 30 ms.

In step 106, the relay device sends the second downlink data frame to the terminal. The second downlink data frame can include the first preamble, and the length information of the first preamble is greater than or equal to the length information of the second preamble, and the length information of the second preamble is less than or equal to the length information of the third preamble.

In some embodiments, a relay device may receive a first downlink data frame sent by a base station, and the relay device may send a second downlink data frame to a terminal according to the first downlink data frame. The second downlink data frame may include a first preamble. The first preamble is a long preamble. The relay device may wake up the terminal by setting a long preamble in the second downlink data frame, which ensures that the terminal can be woken up through the long preamble and receive the downlink data frame from the base station when power saving of the terminal is guaranteed.

A communication process after the terminal is connected to the network will be introduced from the perspective of the terminal, as below.

Figure 2:
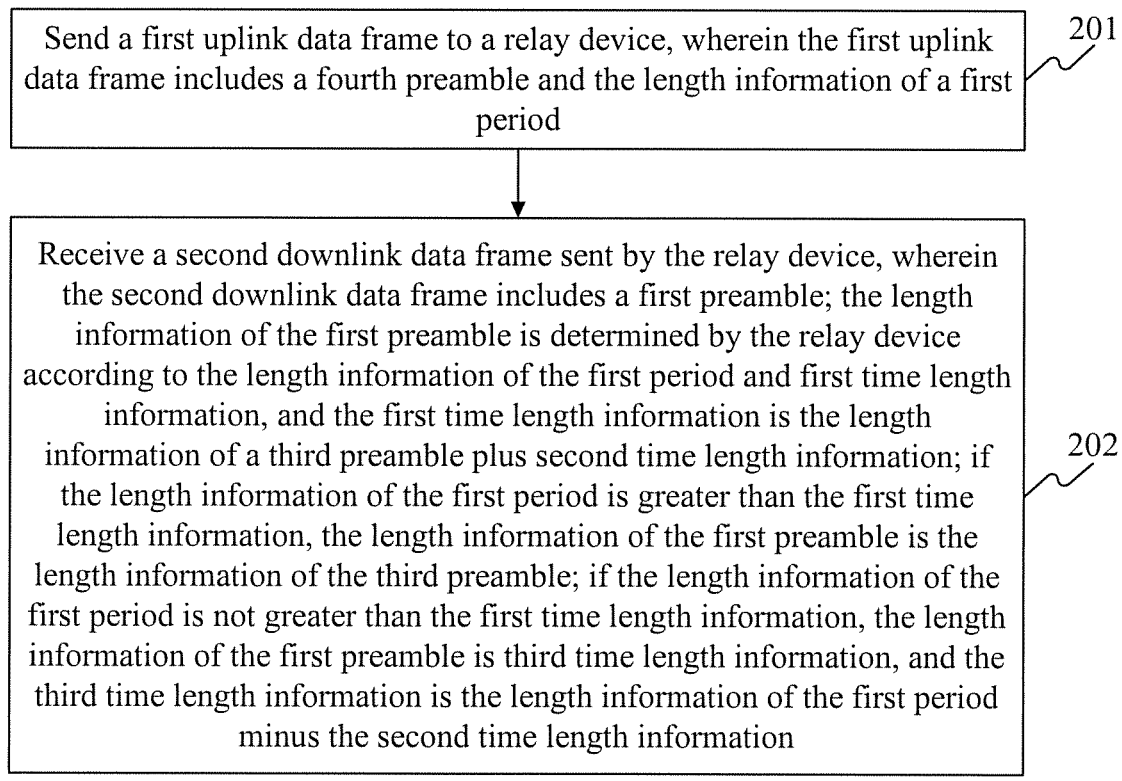
FIG. 2 is a flowchart of a communication method performed by a terminal in a communication system, according to exemplary embodiments of the disclosure.

FIG. 2 is a flowchart of a communication method 200 between a terminal and a base station according to this application. Method 200 can include steps as below.

In step 201, the terminal sends a first uplink data frame to a relay device. The first uplink data frame includes a fourth preamble and the length information of a first period.

In some embodiments, the relay device and the terminal both operate in Class B mode.

After being connected to the network, the terminal may send a first uplink data frame to the relay device. The first uplink data frame may include the length information of the first period, during which the base station sends a first downlink data frame at a foreseeable time as agreed between the terminal and the base station. The base station can open a time slot periodically according to the first period, and sends the first downlink data frame in the time slot. The time slot can be referred to as a ping slot. In some embodiments, the length information may be a time length. The fourth preamble can be a long preamble.

In step 202, the terminal receives a second downlink data frame sent by the relay device. The second downlink data frame includes a first preamble. The length information of the first preamble can be determined by the relay device according to the length information of the first period and first time length information, and the first time length information is the length information of a third preamble plus second time length information. If the length information of the first period is greater than the first time length information, the length information of the first preamble can be the length information of the third preamble. If the length information of the first period is less than or equal to the first time length information, the length information of the first preamble can be third time length information, and the third time length information can be the length information of the first period minus the second time length information.

The first preamble is a long preamble in the second downlink data frame sent by the relay device. The first period may be a ping slot period (Ping-Slot Periodicity). The length information of the first period is the length information between the start time of one ping slot of the terminal to the start time of the next ping slot. The first time length information can be the sum of the length information of the third preamble and the length information of a ping slot.

The second time length information may be the length information of one ping slot.

The third preamble is a long preamble. The third preamble may be a default long preamble used in sending the second downlink data frame to the terminal by the relay device.

If the length information of the ping slot period is greater than the sum of the length information of the third preamble and the length information of one ping slot, it indicates that the length information of the preamble of the second downlink data frame may be set as the length information of the third preamble. Such setting will not occupy the time length of the ping slot. This ensures that the terminal can be woken up by the long preamble and that the ping slot will not be occupied by the preamble. This also ensures that the terminal can be accurately woken up from the sleeping state in power-saving mode, and then receive the downlink data frame.

In some embodiments, when the length information of the ping slot period is greater than the sum of the length information of the third preamble and the length information of one ping slot, the relay device may also set the length information of the first preamble to a value greater than the length information of the third preamble. The sum of the length information of the first preamble and the length information of the ping slot is not greater than the length information of the first period.

If the length information of the ping slot period is not greater than the sum of the length information of the third preamble and the length information of one ping slot, it indicates that the time length of the ping slot will be occupied when the length information of the first preamble is set as the length information of the third preamble. Therefore, in order to avoid such a problem, when the length information of the ping slot period is not greater than the sum of the length information of the third preamble and the time of one ping slot, the length information of the first preamble may be set as the length information of the third preamble minus the length information of the ping slot. This can ensure that the time length of the ping slot will not be occupied by the length set for the first preamble and that the terminal can receive the second downlink data frame through the ping slot.

In some embodiments, step 202 may further include: waking the terminal periodically from a sleeping state according to the first period, and detecting whether the first preamble is received at the time of wakeup; and the terminal receiving the second downlink data frame if the first preamble is detected.

In some embodiments, the method may further include: receiving, by the terminal, a third downlink data frame sent by the relay device.

The relay device may send the second uplink data frame to the base station according to the first uplink data frame. The first uplink data frame may include the fourth preamble. The relay device may replace the fourth preamble in the first uplink data frame with a second preamble to obtain the second uplink data frame. After receiving the second uplink data frame, the base station generates a third downlink data frame, and then sends the third downlink data frame to the relay device. Finally, the relay device sends the third downlink data frame to the terminal.

In some embodiments, receiving, by the terminal, the third downlink data frame sent by the relay device can further include: receiving, within a second reception slot (RX2) after sending the first uplink data frame, the third downlink data frame sent by the relay device.

After receiving the first uplink data frame, the terminal opens two reception slots, including a first reception slot (RX1) and a second reception slot. The base station may send the third downlink data frame to the relay device in the first reception slot after the terminal sends the first uplink data frame. The relay device may send the third downlink data frame to the terminal in the second reception slot after the terminal sends the first uplink data frame.

The relay device may receive the third downlink data frame from the base station and send the third downlink data frame to the terminal in sequence through the two reception slots, and may achieve the greatest compatibility possible by making the most of the original standards and designs specified in the LoRaWAN protocol.

In some embodiments, a relay device may receive a first downlink data frame sent by a base station, and the relay device may send a second downlink data frame to a terminal according to the first downlink data frame. The second downlink data frame includes a first preamble. The first preamble is a long preamble. The relay device may wake up the terminal by setting a long preamble in the second downlink data frame, which ensures that the terminal can be woken up through the long preamble and receive the downlink data frame from the base station when power saving of the terminal is guaranteed.

The solution for a relay device to send a second downlink data frame including a long preamble to the terminal after receiving the first downlink data frame from the base station has been described above, from the perspectives of the relay device and the terminal, respectively.

Another communication process after the terminal is connected to the network will be introduced from the perspective of the relay device, as below.

Figure 3:
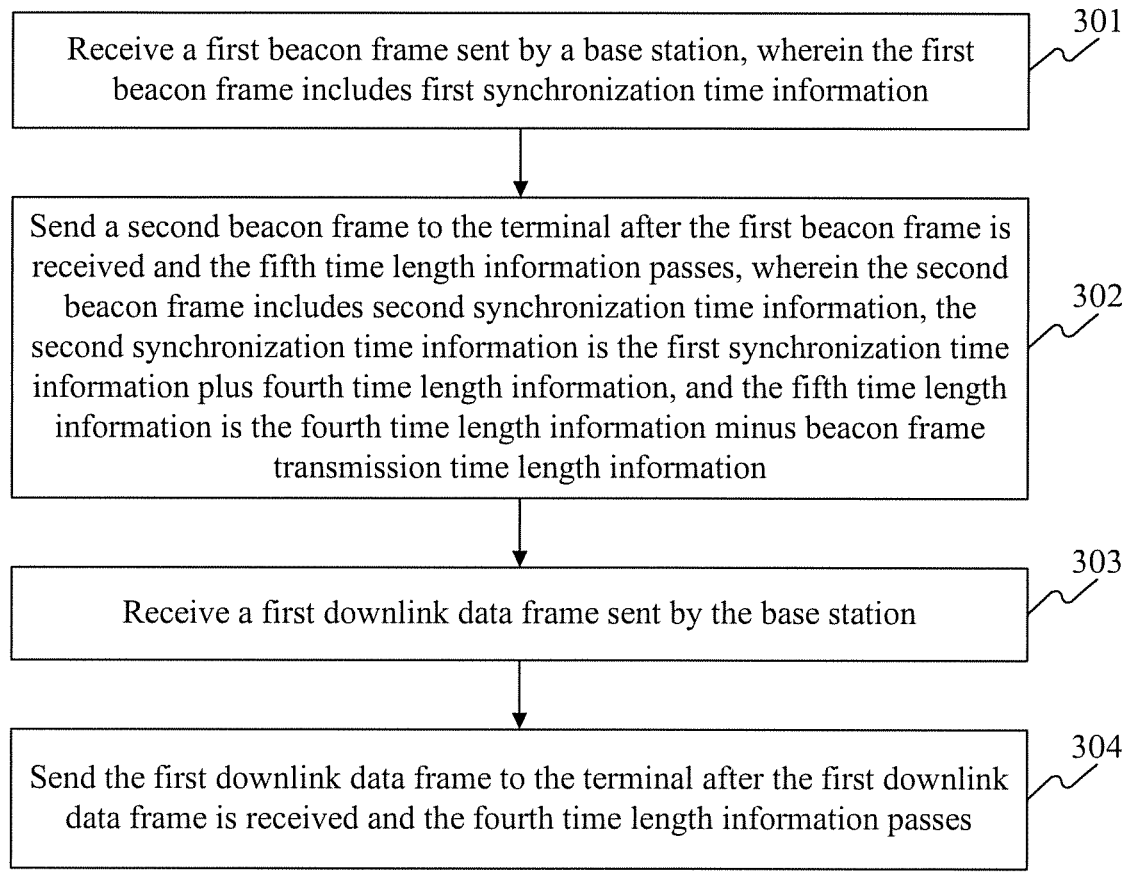
FIG. 3 is a flowchart of a communication method performed by a relay device in a communication system, according to exemplary embodiments of the disclosure.

FIG. 3 is a flowchart of a communication method 300 based on a relay device, according to embodiments of the disclosure. Method 300 can include steps below.

In step 301, a relay device receives a first beacon frame sent by a base station. The first beacon frame includes first synchronization time information.

In some embodiments, the relay device and the terminal both operates in Class B mode.

After the terminal is connected to the network through the relay device, the base station may send the first beacon frame to the relay device. The first beacon frame includes first synchronization time information. The first synchronization time information may be a timestamp when the base station sends the first beacon frame. The relay device may correct its own system time according to the first synchronization time information. For example, the relay device can update its system clock based on the synchronization time in the beacon frame, and the synchronization time can be included in the first synchronization time information in the first beacon frame.

In some embodiments, the length information may be a time length.

Step 301 can further include: waking the relay device periodically from a sleeping state according to a second period, and receiving, at the time of wakeup, the first beacon frame sent by the base station.

The second period refers to a period for receiving and transmitting beacon frames, as agreed between the terminal operating in Class B mode and the base station. The base station may send a first beacon frame periodically according to the second period, and the relay device may be woken up periodically from the sleeping state according to the second period and receive the first beacon frame at the time of wakeup.

In step 302, the relay device sends a second beacon frame to the terminal after the first beacon frame is received and the fifth time length information passes. The second beacon frame can include second synchronization time information. The second synchronization time information is the first synchronization time information plus fourth time length information, and the fifth time length information is the fourth time length information minus beacon frame transmission time length information.

In some embodiments, after receiving the first beacon frame, the relay device may modify the first synchronization time information in the first beacon frame as second synchronization time information to obtain a second beacon frame. The second synchronization time information may be the first synchronization time plus the fourth time length information. The fourth time length information may be a delay. The delay can be a time offset between the time when the relay device begins to receive a beacon frame and the time when the relay device begins to send the beacon frame to the terminal. This time offset may be referred to as a first time offset. The value of this first time offset may be any fixed time value between a beacon frame reserved time (Beacon_Reserved) and a beacon frame period time (Beacon_Period). For example, the beacon frame reserved time may be 2.12 s, and the beacon frame period time may be 128 s. In this case, the first time offset may be set to 10 s, 40 s, and so on. In general, the value of the first time offset should be between 2.12 s and 128 s.

Because the time synchronization information read by the terminal when receiving the beacon frame is expected to be the original synchronization information plus the fourth time length information, the relay device sends the second beacon frame to the terminal after the first beacon frame is received and the fifth time length information passes to align the time. The fifth time length information may also be a delay. The fifth time length information is the fourth time length information minus beacon frame transmission time length information.

For example, the fourth time length information is 10 s, and the fifth time length information is (10 s—beacon frame transmission time length information).

In some embodiments, a second beacon frame sent by the relay device is received by the terminal when woken up periodically from a sleeping state according to the second period, and the difference between the wakeup moment of the relay device and the wakeup moment of the terminal is the fifth time length information.

The relay device sends the second beacon frame to the terminal only after the first beacon frame is received and a delay of fifth time length information passes. Therefore, the moment when the terminal is woken up periodically according to the second period may differ, by the fifth time length information, from the moment when the relay device is woken up periodically according to the second period.

In some embodiments, the method may further include: receiving, by the relay device, a first uplink data frame sent by the terminal. The first uplink data frame can include a fourth preamble. The relay device can also send a second uplink data frame to the base station. The second uplink data frame includes a second preamble that is less than or equal to the fourth preamble. The relay device can further receive a third downlink data frame sent by the base station, and send the third downlink data frame to the terminal.

After receiving the first uplink data frame sent by the terminal, the relay device replaces the fourth preamble in the first uplink data frame with the second preamble to obtain the second uplink data frame. The relay device sends the second uplink data frame to the base station. After receiving the second uplink data frame, the base station generates the third downlink data frame and then sends the third downlink data frame to the relay device. The third downlink data frame includes the second preamble. After receiving the third downlink data frame, the relay device sends the third downlink data frame to the terminal.

In some embodiments, receiving a first uplink data frame sent by the terminal can further include: waking the relay device up periodically from the sleeping state according to a third period, and detecting whether the fourth preamble is received at the time of wakeup. The relay device can receive the first uplink data frame if the fourth preamble is detected.

To save power, the relay device and the terminal operating in Class B mode can be placed in an intermittent sleeping state. The terminal may be woken up periodically according to the third period, and send the first uplink data frame at the time of wakeup. The relay device may also be woken up periodically according to the third period, and receive the first uplink data frame at the time of wakeup. The length of the third period may be determined according to the actual power saving requirements of the relay device.

In some embodiments, sending a second uplink data frame to the base station can further include: determining, by the relay device, whether the terminal is in a preset first information set; and sending, by the relay device, the second uplink data frame to the base station if the terminal is in the preset first information set.

Terminal identifiers of a plurality of terminals are recorded in the first information set. The terminal identifiers may be DevEUIs. The first information set may be a first white list. The relay device extracts a terminal identifier from the second uplink data frame, then searches the first information set to see whether a terminal identifier matched with the extracted terminal identifier exists. If the terminal identifier matched with the extracted terminal identifier exists in the first information set, the relay device determines that the second uplink data frame of the terminal is allowed to be sent to the base station. The relay device may acquire the first information set in an out-of-band method. The out-of-band method may be a factory setting of the relay device. The first information set may be preset in the relay device before leaving the factory.

In some embodiments, receiving a third downlink data frame sent by the base station can further include: receiving, within a first reception slot after the terminal sends the first uplink data frame, the third downlink data frame sent by the base station.

In some embodiments, sending the third downlink data frame to the terminal can further include: sending, by the relay device, the third downlink data frame to the terminal within a second reception slot after the terminal sends the first uplink data frame.

After receiving the first uplink data frame, the terminal opens two reception slots, including a first reception slot and a second reception slot. The base station may send the third downlink data frame to the relay device in the first reception slot after the terminal sends the first uplink data frame. The relay device may send the third downlink data frame to the terminal in the second reception slot after the terminal sends the first uplink data frame.

In step 303, the relay device receives a first downlink data frame sent by the base station.

In some embodiments, the first downlink data frame is a downlink data frame sent by the base station in a foreseeable time slot, referred to as a ping frame.

In some embodiments, step 303 can further include: waking the relay device up periodically from the sleeping state according to a first period, and receiving, at the time of wakeup, the first downlink data frame sent by the base station.

The first period refers to a period during which the base station sends the first downlink data frame at a foreseeable time as agreed between the terminal operating in Class B mode and the base station. The first period may be a ping slot period (Ping-Slot Periodicity). The length information of the first period is the length information between the start time of one ping slot of the terminal to the start time of the next ping slot.

The base station may open a time slot periodically according to the first period and send the first downlink data frame in the time slot. The time slot is referred to as a ping slot. The relay device may open a time slot periodically according to the first period and receive the first downlink data frame in the time slot. The length information of the first period may be provided in the first uplink data frame sent by the terminal. After receiving the first uplink data frame sent by the terminal, the relay device may extract the length information of the first period therefrom. The length information of the first period may also be provided in the second uplink data frame sent by the relay device. After receiving the second uplink data frame sent by the relay device, the base station may extract the length information of the first period therefrom. A ping slot information request (PingSlotInfoReq) command may be carried in the first uplink data frame. The length information of the first period may be included in the ping slot information request command. The ping slot information request may be on an "Fopts" field in a frame header format of the first uplink data frame.

In step 304, the relay device sends the first downlink data frame to the terminal after the first downlink data frame is received and the fourth time length information passes.

The first downlink data frame sent by the relay device is received by the terminal when woken up periodically from a sleeping state according to the first period, and the difference between the wakeup moment of the relay device and the wakeup moment of the terminal is the fourth time length information.

In some embodiments, the relay device sends the first downlink data frame to the terminal only after the first downlink data frame is received and the fourth time length information passes. Therefore, the moment when the terminal is woken up periodically according to the first period may differ, by the fourth time length information, from the moment when the relay device is woken up periodically according to the first period.

In some embodiments, the relay device sends the second beacon frame to the terminal only after the first beacon frame sent by the base station is received and the fifth time length information passes. By introducing the delay, the time when the base station sends the first beacon frame and the time when the relay device sends the second beacon frame can be separated effectively, so as to avoid interference or conflict caused by the base station and the relay device sending beacon frames at the same time.

The relay device sends the first downlink data frame to the terminal only after the first downlink data frame sent by the base station is received and a delay of the fourth time length information passes. By introducing the delay, it is possible to solve the problem of the relay device being unable to receive and transmit data frames at the same time.

A communication process after the terminal is connected to the network will be introduced in the following from the perspective of the terminal.

Figure 4:
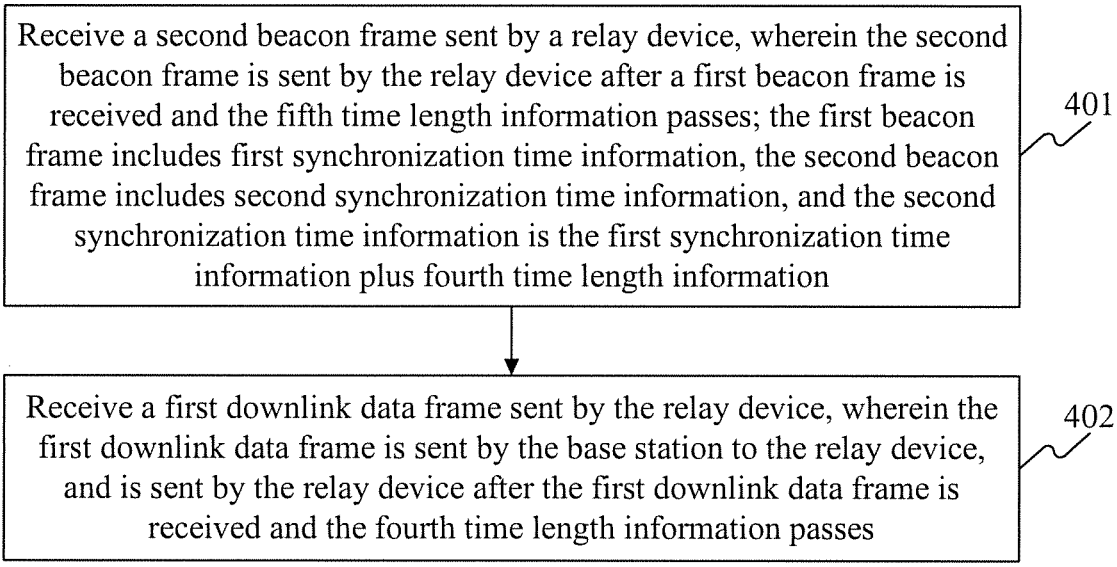
FIG. 4 is a flowchart of a communication method performed by a terminal in a communication system, according to exemplary embodiments of the disclosure.

FIG. 4 is a flowchart of a communication method 400 between a terminal and a base station, according to embodiments of the disclosure. Method 400 may include the following steps.

In step 401, the terminal receives a second beacon frame sent by a relay device, wherein the second beacon frame is sent by the relay device after a first beacon frame is received and the fifth time length information passes; the first beacon frame includes first synchronization time information, the second beacon frame includes second synchronization time information, and the second synchronization time information is the first synchronization time information plus fourth time length information.

In some embodiments, the relay device and the terminal both operate in Class B mode.

After the terminal is connected to the network through the relay device, the base station may send the first beacon frame to the relay device. The first beacon frame includes the first synchronization time information. The relay device may update its system time according to the first synchronization time information. The relay device may modify the first synchronization time information in the first beacon frame to the second synchronization time information to obtain the second beacon frame. The terminal may update its system clock according to the second synchronization time information in the second beacon frame. In some embodiments, the system time can be updated based on synchronization time in the beacon frame. The synchronization time is included in the second synchronization time information in the second beacon frame.

In some embodiments, the length information may be a time length.

The second synchronization time information may be the first synchronization time plus the fourth time length information. The fourth time length information may be a delay. The delay can be a time offset between the time when the relay device begins to receive a beacon frame and the time when the relay device begins to send the beacon frame to the terminal. This time offset may be referred to as a first time offset. The value of this first time offset may be any fixed time value between a beacon frame reserved time (Beacon_Reserved) and a beacon frame period time (Beacon_Period). For example, the beacon frame reserved time may be 2.12 s, and the beacon frame period time may be 128 s. In this case, the first time offset may be set to 10 s, 40 s, and so on. In general, the value of the first time offset should be between 2.12 s and 128 s.

Because the time synchronization information read by the terminal when receiving the beacon frame is expected to be the original synchronization information plus the fourth time length information, the relay device sends the second beacon frame to the terminal after the first beacon frame is received and the fifth time length information passes to align the time. The fifth time length information may also be a delay. The fifth time length information is the fourth time length information minus beacon frame transmission time length information.

In some embodiments, step 401 may include: waking the terminal up periodically from a sleeping state according to a second period, and receiving, at the time of wakeup, the second beacon frame sent by the relay device.

The second period can be a period for receiving and transmitting beacon frames, as agreed between the terminal operating in Class B mode and the base station. The base station may send a first beacon frame periodically according to the second period, and the relay device may be woken up periodically from the sleeping state according to the second period and receive the first beacon frame at the time of wakeup.

The relay device sends the second beacon frame to the terminal only after the first beacon frame is received and a delay of the fifth time length information passes. Therefore, the moment when the terminal is woken up periodically according to the second period may differ, by the fifth time length information, from the moment when the relay device is woken up periodically according to the second period.

In some embodiments, the method may further include: sending, by the terminal, a first uplink data frame to the relay device. The first uplink data frame includes a fourth preamble. The terminal can also receive a third downlink data frame sent by the relay device, wherein the third downlink data frame is generated by the base station according to a second uplink data frame sent by the relay device, the second uplink data frame includes a second preamble that is not greater than the fourth preamble, and the second uplink data frame is generated by the relay device according to the first uplink data frame sent by the terminal.

In some embodiments, the relay device and the terminal can be placed in an intermittent sleeping state to save power. The terminal may be woken up periodically according to a third period, and send the first uplink data frame at the time of wakeup. The relay device may also be woken up periodically according to the third period, and receive the first uplink data frame at the time of wakeup. The length of the third period may be determined according to the actual power saving requirements of the relay device.

After receiving the first uplink data frame sent by the terminal, the relay device can replace the fourth preamble in the first uplink data frame with the second preamble to obtain the second uplink data frame. The relay device can send the second uplink data frame to the base station. After receiving the second uplink data frame, the base station generates a third downlink data frame and then sends the third downlink data frame to the relay device. The third downlink data frame includes a second preamble. After receiving the third downlink data frame, the relay device sends the third downlink data frame to the terminal.

In some embodiments, receiving, by the terminal, a third downlink data frame sent by the relay device may include: receiving, within a second reception slot after sending the first uplink data frame, the third downlink data frame sent by the relay device.

After receiving the first uplink data frame, the terminal opens two reception slots, including a first reception slot and a second reception slot. The base station may send the third downlink data frame to the relay device in the first reception slot after the terminal sends the first uplink data frame. The relay device may send the third downlink data frame to the terminal in the second reception slot after the terminal sends the first uplink data frame.

In step 402, the terminal receives a first downlink data frame sent by the relay device. The first downlink data frame is sent by the base station to the relay device, and is sent by the relay device after the first downlink data frame is received and the fourth time length information passes.

In some embodiments, the first downlink data frame is a downlink data frame sent by the base station in a foreseeable time slot, referred to as a ping frame.

In some embodiments, step 402 may include: waking the terminal up periodically from the sleeping state according to a first period, and receiving the first downlink data frame sent by the relay device at the time of wakeup. The first downlink data frame is sent by the base station, and is received by the relay device when woken up periodically from a sleeping state according to the first period, and the difference between the wakeup moment of the relay device and the wakeup moment of the terminal is the fourth time length information.

The first period can be a period during which the base station sends the first downlink data frame at a foreseeable time as agreed between the terminal operating in Class B mode and the base station. The first period may be a ping slot period (Ping-Slot Periodicity). The length information of the first period is the length information between the start time of one ping slot of the terminal to the start time of the next ping slot.

The base station may open a time slot periodically according to the first period and send the first downlink data frame in the time slot. The time slot is referred to as a ping slot. The relay device may open a time slot periodically according to the first period and receive the first downlink data frame in the time slot. The length information of the first period may be provided in the first uplink data frame sent by the terminal. After receiving the first uplink data frame sent by the terminal, the relay device may extract the length information of the first period therefrom. The length information of the first period may also be provided in the second uplink data frame sent by the relay device. After receiving the second uplink data frame sent by the relay device, the base station may extract the length information of the first period therefrom. A ping slot information request (PingSlotInfoReq) command may be carried in the first uplink data frame. The length information of the first period may be included in the ping slot information request command. The ping slot information request may be on an "Fopts" field in a frame header format of the first uplink data frame.

In some embodiments, the relay device sends the first downlink data frame to the terminal only after the fourth downlink data frame is received and a delay of the fourth time length information passes. Therefore, the moment when the terminal is woken up periodically according to the first period may differ, by the fourth time length information, from the moment when the relay device is woken up periodically according to the first period.

In some embodiments, the relay device sends the second beacon frame to the terminal only after the first beacon frame sent by the base station is received and a delay of the fifth time length information passes. By introducing the delay, the time when the base station sends the first beacon frame and the time when the relay device sends the second beacon frame can be separated effectively, so as to avoid interference or conflict caused by the base station and the relay device sending beacon frames at the same time.

The relay device sends a first downlink data frame to the terminal only after the first downlink data frame sent by the base station is received and a delay of the fourth time length information passes. By introducing the delay, it is possible to solve the problem of the relay device being unable to receive and transmit data frames at the same time.

The solutions for the relay device to send the second beacon frame to the terminal only after the first beacon frame sent by the base station is received and a delay of the fifth time length information passes, and to send the first downlink data frame to the terminal only after the first downlink data frame sent by the base station is received and a delay of the fourth time length information passes, have been described above from the perspectives of the relay device and the terminal, respectively.

Figure 5:
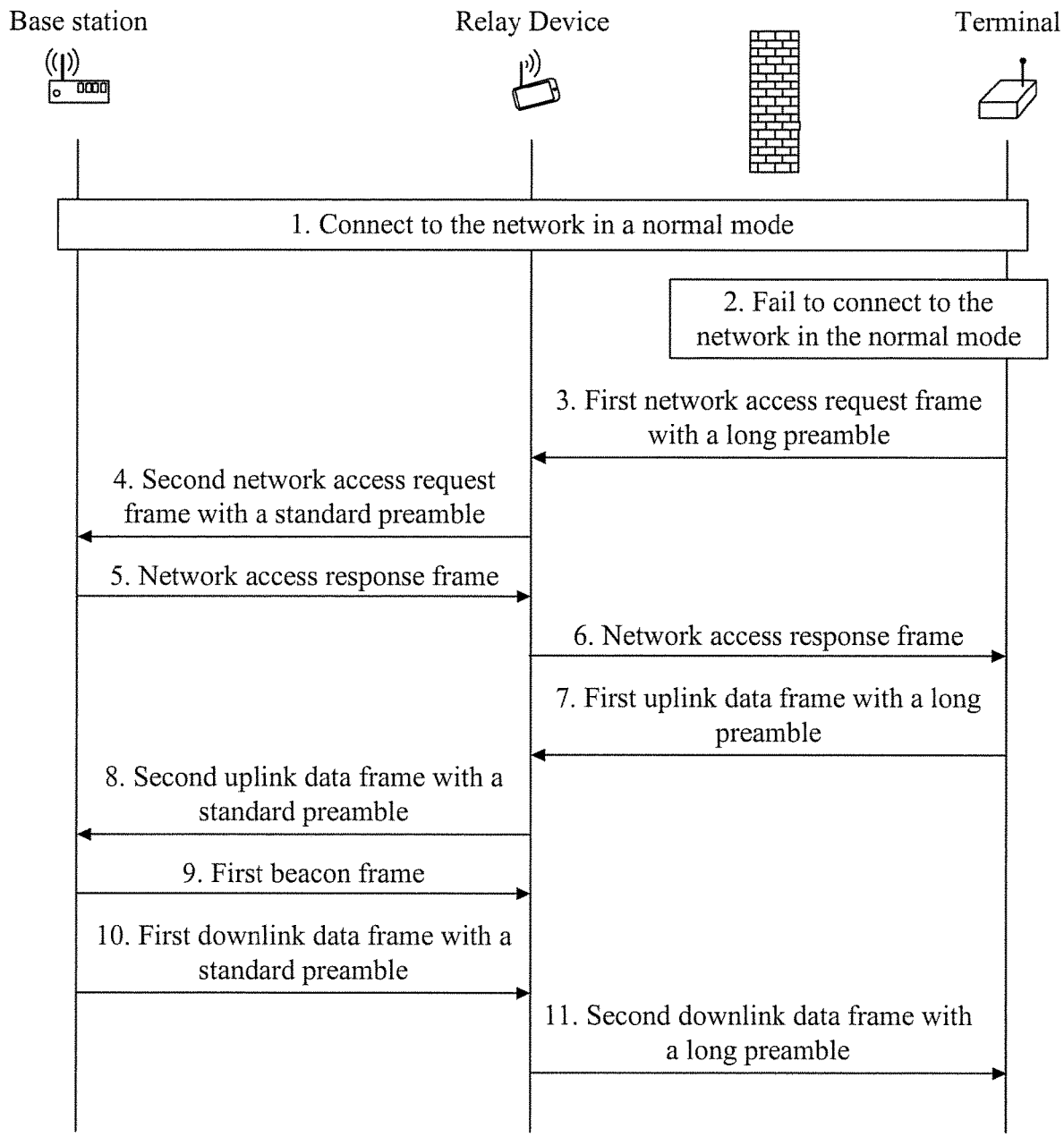
FIG. 5 is a flowchart of a communication method performed by a communication system including a terminal, a relay device, and a base station, according to exemplary embodiments of the disclosure.

To enable those skilled in the art to better understand the embodiments of this application, the solution of the relay device sending a downlink data frame with a long preamble to the terminal is illustrated in the following through an example. FIG. 5 is a flowchart of communication between a terminal and a base station, according to embodiments of the disclosure.

1. The terminal is connected to the network in a normal mode.

2. The terminal fails to be connected to the network in the normal mode.

3. A relay device is woken up by a first network access request frame with a long preamble sent by the terminal, and receives the first network access request frame.

4. The relay device checks its second white list, and if the terminal is in the second white list, it converts the first network access request frame with a long preamble into a second network access request frame with a standard preamble, and forwards the second network access request frame with a standard preamble to the base station. The second white list is configured to judge whether the network access request frame of the terminal is allowed to be forwarded.

5. The relay device receives a network access response frame (Join-Accept) of the base station, and updates a first white list. The first white list is configured to judge whether an uplink data frame sent by the terminal is allowed to be forwarded.

6. The relay device sends the network access response frame to the terminal through a second reception slot.

7. The relay device receives a first uplink data frame with a long preamble (fourth preamble) sent by the terminal. Ping slot period information and a ClassB identifier are carried in the first uplink data frame. The ping slot period information may be carried in a ping slot information request (PingslotInfoReq). The relay device analyzes the ping slot period information and the ClassB identifier in the uplink data frame to identify that the terminal is switched to ClassB mode.

8. The relay device checks its first white list, and if the terminal is in the first white list, it converts the first uplink data frame with a long preamble into a second uplink data frame with a standard preamble (second preamble), and forwards the second uplink data frame with a standard preamble to the base station.

9. The relay device receives a first beacon frame sent by the base station.

10. The relay device receives a first downlink data frame (ping frame) with a standard preamble sent by the base station.

11. The relay device adds a long preamble (first preamble) to the first downlink data frame and generates a second downlink data frame. The length of the long preamble of the second downlink data frame is determined by a ping slot period carried in the first uplink data frame sent by the terminal. Assuming that the length of the long preamble is 2 s and the length of the ping slot is 30 ms by default, the length of the long preamble of the second downlink data frame may be 2 s (a third preamble, a default long preamble value) if the ping slot period is greater than 2.03 s. The length of the long preamble of the second downlink data frame may be the ping slot period minus 30 ms (the length of the ping slot) if the ping slot period is not greater than 2.03 s. The relay device sends the second downlink data frame carrying a long preamble to the terminal. The terminal is woken up by the long preamble and receives the second downlink data frame.

The solutions of delay-forwarding a beacon frame and delay-forwarding a downlink data frame are illustrated in the following through an example.

Figure 6:
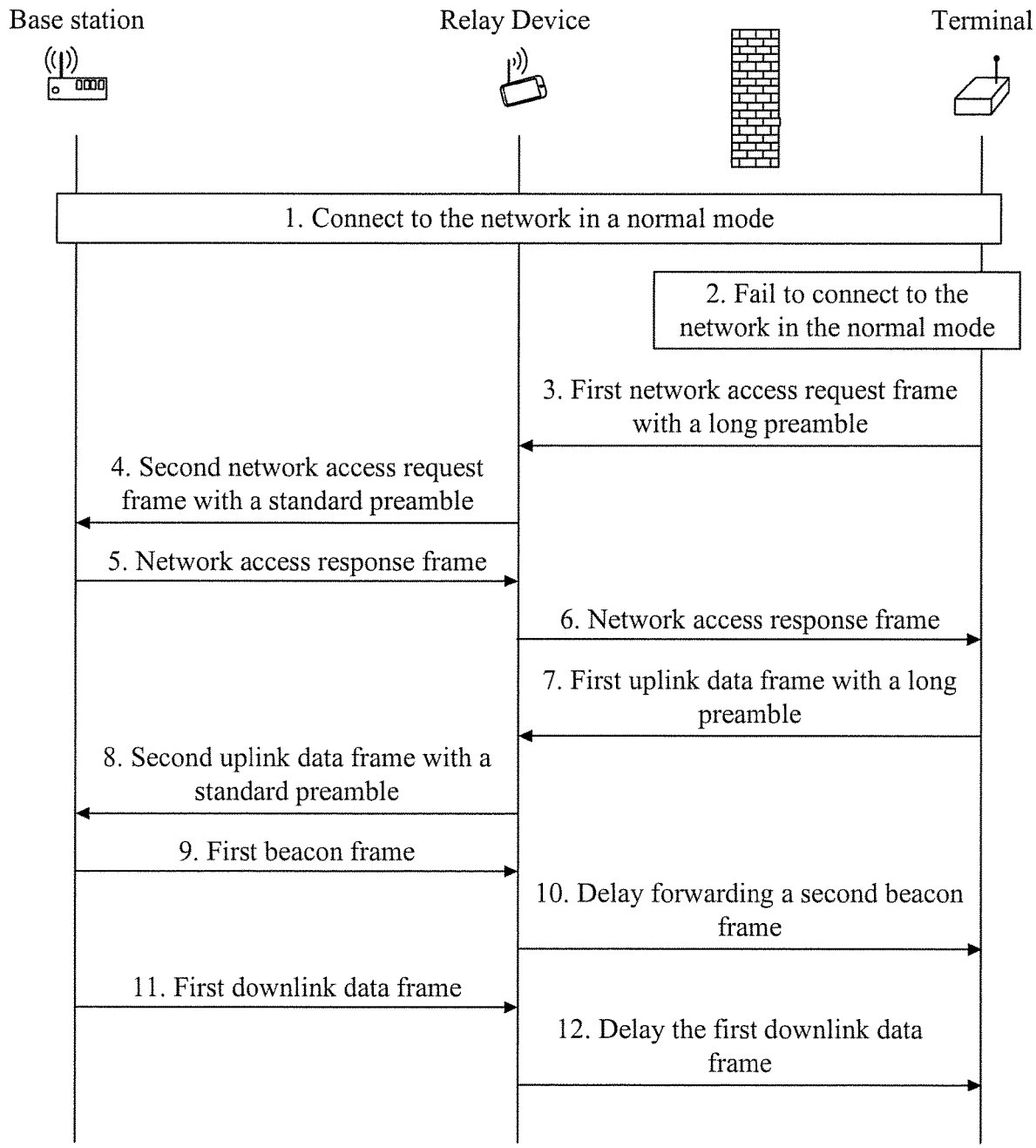
FIG. 6 is a flowchart of another communication method performed by a communication system including a terminal, a relay device, and a base station, according to exemplary embodiments of the disclosure.

FIG. 6 is another flowchart of communication between a terminal and a base station, according to embodiments of the disclosure.

1. The terminal is connected to the network in a normal mode.

2. The terminal fails to be connected to the network in the normal mode.

3. A relay device is woken up by a first network access request frame with a long preamble sent by the terminal, and receives the first network access request frame.

4. The relay device checks its second white list, and if the terminal is in the second white list, it converts the first network access request frame with a long preamble into a second network access request frame with a standard preamble, and forwards the second network access request frame with a standard preamble to the base station. The second white list is configured to judge whether a network access request frame of the terminal is allowed to be forwarded.

5. The relay device receives a network access response frame (Join-Accept) of the base station, and updates a first white list. The first white list is configured to judge whether an uplink data frame sent by the terminal is allowed to be forwarded.

6. The relay device sends the network access response frame to the terminal through a second reception slot.

7. The relay device receives a first uplink data frame with a long preamble (fourth preamble) sent by the terminal. Ping slot period information and a ClassB identifier are carried in the first uplink data frame. The ping slot period information may be carried in a ping slot information request (PingslotInfoReq). The relay device analyzes the ping slot period information and the ClassB identifier in the uplink data frame to identify that the terminal is switched to ClassB mode.

8. The relay device checks its first white list, and if the terminal is in the first white list, it converts the uplink data frame with a long preamble into a second uplink data frame with a standard preamble (second preamble), and forwards the second uplink data frame with a standard preamble to the base station.

9. The relay device receives, according to a periodic time (T1) specified in a LoRaWAN protocol, a first beacon frame sent by the base station.

10. The relay device sends a second beacon frame to the terminal at moment T1x after T1 (e.g., T1+first time offset–beacon frame transmission time length). The synchronization time included in the second beacon frame is (T1+first time offset). The first time offset may be set to 10 s. The terminal receives the second beacon frame at T1x, and updates its own system clock according to the synchronization time in the second beacon frame.

11. The relay device receives, according to a periodic time (T2) specified in the LoRaWAN protocol, a first downlink data frame (ping frame) with a standard preamble sent by the base station.

12. The relay device sends the first downlink data frame with a standard preamble to the terminal at moment T2x (e.g., T2+first time offset) after T2.

It should be noted that for ease of description, the method embodiments are all described as a series of action combinations. However, it is appreciated that embodiments of this application are not limited to the described sequence of the actions, because some steps may be performed in another sequence or at the same time according to the embodiments of this application.

Figure 7:
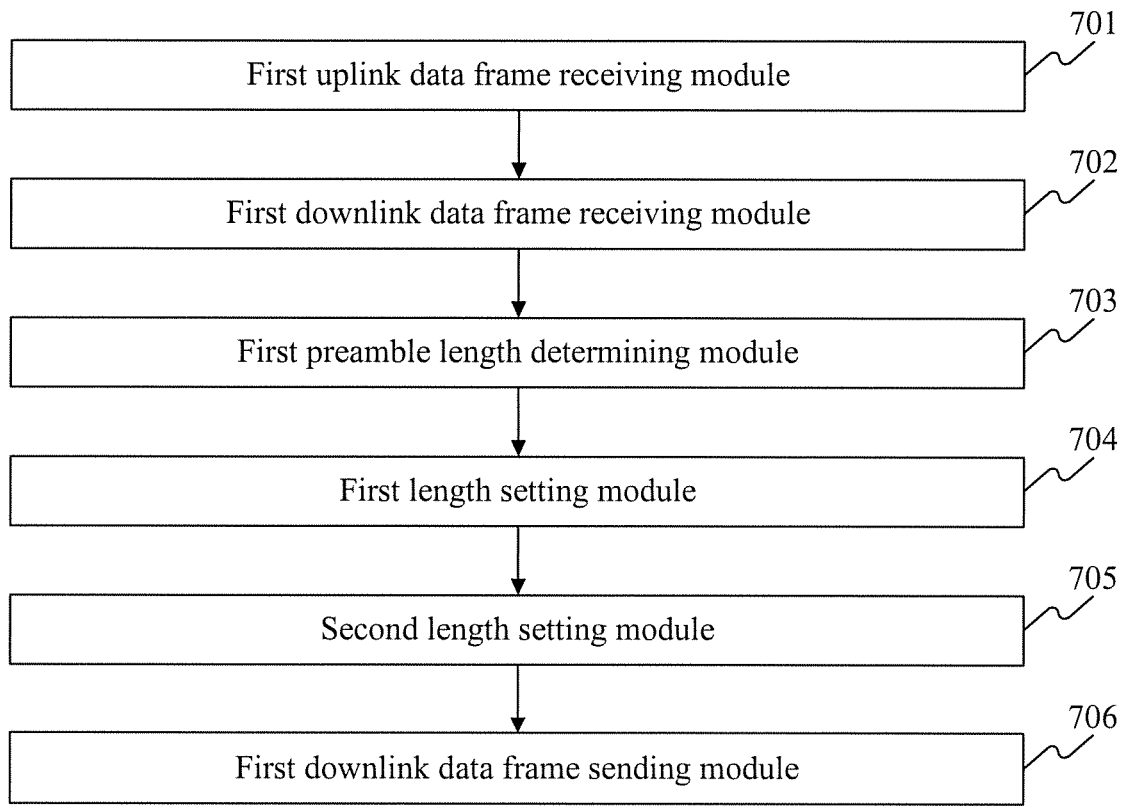
FIG. 7 is a structural block diagram of a relay device, according to exemplary embodiments of the disclosure.

FIG. 7 is a structural block diagram of a communication apparatus 700, according to embodiments of the disclosure. The apparatus 700 can include below modules.

A first uplink data frame receiving module 701 can be located in a relay device and configured to receive a first uplink data frame sent by a terminal. The first uplink data frame includes length information of a first period.

A first downlink data frame receiving module 702 can be located in the relay device and configured to receive a first downlink data frame sent by a base station. The first downlink data frame includes a second preamble.

A first preamble length determining module 703 can be located in the relay device and configured to determine length information of a first preamble according to the length information of the first period and first time length information. The first time length information is the length information of a third preamble plus second time length information.

A first length setting module 704 can be located in the relay device and configured to set the length information of the first preamble as the length information of the third preamble if the length information of the first period is greater than the first time length information.

A second length setting module 705 can be located in the relay device and configured to set the length information of the first preamble as third time length information if the length information of the first period is not greater than the first time length information. The third time length information is the length information of the first period minus the second time length information.

A first downlink data frame sending module 706 can be located in the relay device and configured to send a second downlink data frame to the terminal. The second downlink data frame includes the first preamble, the length information of the first preamble is not less than the length information of the second preamble, and the length information of the second preamble is not greater than the length information of the third preamble.

In some embodiments, apparatus 700 can further include: a preamble acquisition module located in the relay device and configured to acquire the preset third preamble.

In some embodiments, apparatus 700 can further include: a first beacon frame receiving module located in the relay device and configured to receive a first beacon frame sent by the base station, wherein the first beacon frame is configured for time correction.

In some embodiments, the first uplink data frame includes a first mode identifier; and apparatus 700 can further include: a first mode determining module located in the relay device and configured to determine according to the first mode identifier that the terminal is operating in first mode.

In some embodiments, apparatus 700 can further include: a first uplink data frame sending module located in the relay device and configured to send a second uplink data frame to the base station, wherein the second uplink data frame includes the second preamble; a second downlink data frame receiving module located in the relay device and configured to receive a third downlink data frame sent by the base station; and a second downlink data frame sending module located in the relay device and configured to send the third downlink data frame to the terminal.

In some embodiments, the first uplink data frame receiving module 701 may include: a first wakeup and detecting submodule configured to wake up periodically from a sleeping state according to a third period, and detect whether a fourth preamble is received at the time of wakeup; and a first uplink data frame receiving submodule configured to receive the first uplink data frame if the fourth preamble is detected.

In some embodiments, the first downlink data frame receiving module 702 may include: a first downlink data frame receiving submodule configured to be woken up periodically from a sleeping state according to the first period, and receive, at the time of wakeup, the first downlink data frame sent by the base station.

In some embodiments, the first uplink data frame sending module may include: a first terminal judging submodule configured to judge whether the terminal is in a preset first information set; and a first uplink data frame sending submodule configured to send the second uplink data frame to the base station if the terminal is in the preset first information set.

In some embodiments, the first beacon frame receiving module may include: a first beacon frame receiving submodule configured to be woken up periodically from a sleeping state according to a second period, and receive, at the time of wakeup, the first beacon frame sent by the base station.

In some embodiments, the second downlink data frame receiving module may include: a second downlink data frame receiving submodule configured to receive, within a first reception slot after the terminal sends the first uplink data frame, the third downlink data frame sent by the base station.

In some embodiments, the second downlink data frame sending module may include: a second downlink data frame sending submodule configured to send the third downlink data frame to the terminal within a second reception slot after the terminal sends the first uplink data frame.

Figure 8:
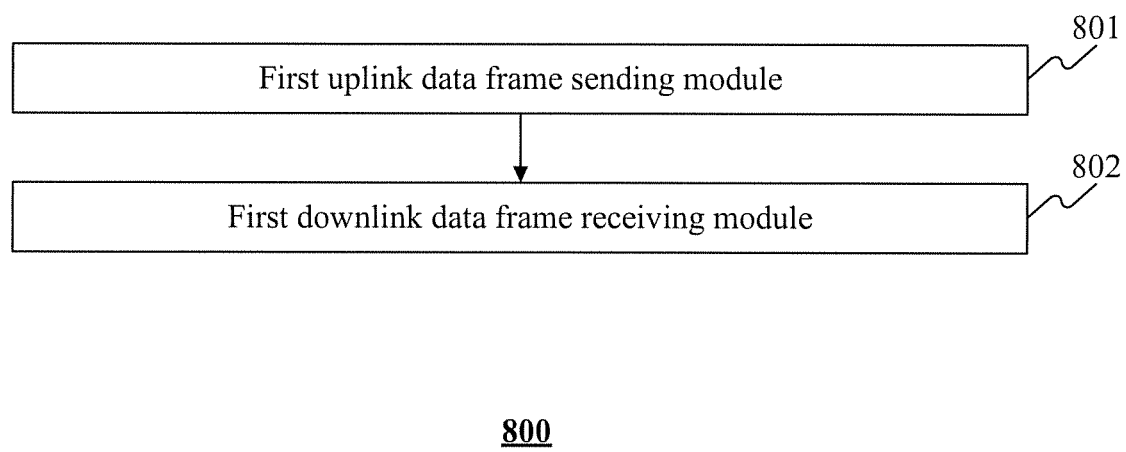
FIG. 8 is a structural block diagram of a terminal, according to exemplary embodiments of the disclosure.

FIG. 8 is a structural block diagram of a communication apparatus 800 between a terminal and a base station, according to embodiments of the disclosure. Apparatus 800 may be a terminal and include the following modules.

A first uplink data frame sending module 801 can be located in the terminal and configured to send a first uplink data frame to a relay device, wherein the first uplink data frame includes a fourth preamble and the length information of a first period.

A first downlink data frame receiving module 802 can be located in the terminal and configured to receive a second downlink data frame sent by the relay device. The second downlink data frame includes a first preamble, the length information of the first preamble is determined by the relay device according to the length information of the first period and first time length information, and the first time length information is the length information of a third preamble plus second time length information. If the length information of the first period is greater than the first time length information, the length information of the first preamble is the length information of the third preamble. If the length information of the first period is not greater than the first time length information, the length information of the first preamble is third time length information, and the third time length information is the length information of the first period minus the second time length information.

In some embodiments, the apparatus may further include: a second downlink data frame receiving module located in the terminal and configured to receive a third downlink data frame sent by the relay device.

In some embodiments, the first downlink data frame receiving module 802 may include: a first wakeup and detecting submodule configured to wake up periodically from a sleeping state according to the first period, and detect whether the first preamble is received at the time of wakeup; and a first downlink data frame receiving submodule configured to receive the second downlink data frame if the first preamble is detected.

In some embodiments, the second downlink data frame receiving module may include: a second downlink data frame receiving submodule configured to receive, within a second reception slot after sending the first uplink data frame, the third downlink data frame sent by the relay device.

Figure 9:
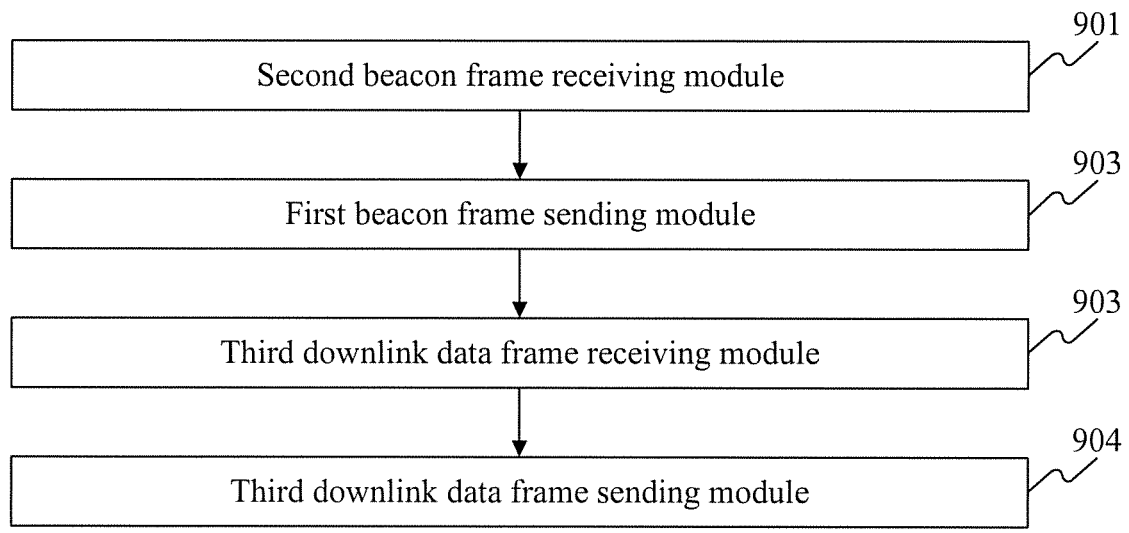
FIG. 9 is a structural block diagram of a relay device, according to exemplary embodiments of the disclosure.

FIG. 9 is a structural block diagram of a communication apparatus 900, according to embodiments of the disclosure. The apparatus 900 may include the following modules.

A second beacon frame receiving module 901 can be located in a relay device and configured to receive a first beacon frame sent by a base station. The first beacon frame includes first synchronization time information.

A first beacon frame sending module 902 can be located in the relay device and configured to send the second beacon frame to the terminal after the first beacon frame is received and the fifth time length information passes. The second beacon frame includes second synchronization time information, the second synchronization time information is the first synchronization time information plus fourth time length information, and the fifth time length information is the fourth time length information minus beacon frame transmission time length information.

A third downlink data frame receiving module 903 can be located in the relay device and configured to receive a first downlink data frame sent by the base station; and a third downlink data frame sending module 904 located in the relay device and configured to send the first downlink data frame to the terminal after the first downlink data frame is received and the fourth time length information passes.

In some embodiments, apparatus 900 may further include: a second uplink data frame receiving module located in the relay device and configured to receive a first uplink data frame sent by the terminal; a second uplink data frame sending module located in the relay device and configured to send a second uplink data frame to the base station; a fourth downlink data frame receiving module located in the relay device and configured to receive a third downlink data frame sent by the base station; and a fourth downlink data frame sending module located in the relay device and configured to send the third downlink data frame to the terminal. The first uplink data frame includes a fourth preamble, the second uplink data frame includes a second preamble that is not greater than the fourth preamble.

In some embodiments, the second beacon frame receiving module 901 may include: a second beacon frame receiving submodule configured to be woken up periodically from a sleeping state according to a second period, and receive, at the time of wakeup, the first beacon frame sent by the base station; wherein the second beacon frame sent by the relay device is received by the terminal when woken up periodically from a sleeping state according to the second period, and the difference between the wakeup moment of the relay device and the wakeup moment of the terminal is the fifth time length information.

In some embodiments, the third downlink data frame receiving module 903 may include: a third downlink data frame receiving submodule configured to be woken up periodically from a sleeping state according to a first period, and receive, at the time of wakeup, the first downlink data frame sent by the base station, wherein a first downlink data frame sent by the relay device is received by the terminal when woken up periodically from the sleeping state according to the first period, and the difference between the wakeup moment of the relay device and the wakeup moment of the terminal is the fourth time length information.

In some embodiments, the second uplink data frame receiving module may include: a second wakeup and detecting submodule configured to wake up periodically from a sleeping state according to a third period, and detect whether the fourth preamble is received at the time of wakeup; and a second uplink data frame receiving submodule configured to receive the first uplink data frame if the fourth preamble is detected.

In some embodiments, the second uplink data frame sending module may include: a second terminal judging submodule configured to judge whether the terminal is in a preset first information set; and a second uplink data frame sending submodule configured to send the second uplink data frame to the base station if the terminal is in the preset first information set.

In some embodiments, the fourth downlink data frame receiving module may include: a fourth downlink data frame receiving submodule configured to receive, within a first reception slot after the terminal sends the first uplink data frame, the third downlink data frame sent by the base station.

The fourth downlink data frame sending module may include: a fourth downlink data frame sending submodule configured to send the third downlink data frame to the terminal within a second reception slot after the terminal sends the first uplink data frame.

Figure 10:
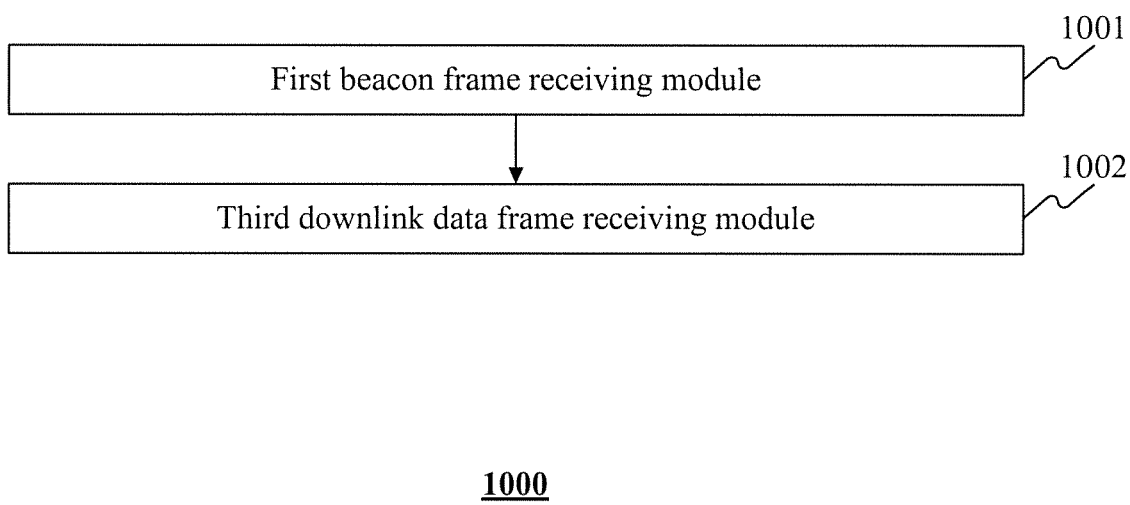
FIG. 10 is a structural block diagram of a terminal, according to exemplary embodiments of the disclosure.

FIG. 10 is a structural block diagram of a communication apparatus 1000 between a terminal and a base station, according to embodiments of the disclosure. Apparatus 1000 may be the terminal and include the following modules.

A first beacon frame receiving module 1001 can be located in the terminal and configured to receive a second beacon frame sent by a relay device. The second beacon frame is sent by the relay device after a first beacon frame is received and the fifth time length information passes; the first beacon frame includes first synchronization time information, the second beacon frame includes second synchronization time information, and the second synchronization time information is the first synchronization time information plus fourth time length information.

A third downlink data frame receiving module 1002 can be located in the terminal and configured to receive a first downlink data frame sent by the relay device, wherein the first downlink data frame is sent by the base station to the relay device, and is sent by the relay device after the first downlink data frame is received and the fourth time length information passes.

In some embodiments, apparatus 1000 may further include: a second uplink data frame sending module located in the terminal and configured to send a first uplink data frame to the relay device, wherein the first uplink data frame includes a fourth preamble; and a fourth downlink data frame receiving module located in the terminal and configured to receive a third downlink data frame sent by the relay device, wherein the third downlink data frame is generated by the base station according to a second uplink data frame sent by the relay device, the second uplink data frame includes a second preamble that is not greater than the fourth preamble, and the second uplink data frame is generated by the relay device according to the first uplink data frame sent by the terminal.

In some embodiments, first beacon frame receiving module 1001 may further include: a first beacon frame receiving submodule configured to be woken up periodically from a sleeping state according to a second period, and receive, at the time of wakeup, the second beacon frame sent by the relay device.

In some embodiments, third downlink data frame receiving module 1002 may further include: a third downlink data frame receiving submodule configured to be woken up periodically from a sleeping state according to a first period, and receive, at the time of wakeup, the first downlink data frame sent by the relay device, wherein the first downlink data frame is sent by the base station, and is received by the relay device when woken up periodically from a sleeping state according to the first period, and the difference between the wakeup moment of the relay device and the wakeup moment of the terminal is the fourth time length information.

In some embodiments, the fourth downlink data frame receiving module may include: a fourth downlink data frame receiving submodule configured to receive, within a second reception slot after sending the first uplink data frame, the third downlink data frame sent by the relay device.

Above apparatuses are similar to the above methods. For related parts, refer to the descriptions of the parts in the above description of the methods.

Embodiments of the disclosure further provide a computer system. The computer system includes at least one processor and a memory configured to store a set of instructions that is executable by the at least one processor to cause the computer system to perform the above methods.

Embodiments of the disclosure also provide a computer program product. The computer program product may include a non-transitory computer readable storage medium having computer readable program instructions thereon for causing a processor to carry out the above-described methods.

The computer readable storage medium may be a tangible device that can store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer readable program instructions for carrying out the above-described methods may be assembler instructions.

Embodiments of the disclosure are described with reference to flowcharts and/or block diagrams of the method, the terminal device (system), and the computer program product according to the embodiments of this application. It should be understood that a computer program instruction may be configured to implement each process and/or block in the flowcharts and/or block diagrams and combinations of processes and/or blocks in the flowcharts and/or block diagrams. The computer program instructions may be provided to a general-purpose computer, a special-purpose computer, an embedded processor, or a processor of another programmable data processing terminal device to generate a machine, such that the computer or the processor of another programmable data processing terminal device executes an instruction to generate an apparatus configured to implement functions designated in one or more processes in a flowchart and/or one or more blocks in a block diagram.

The communication method based on a relay device, communication method between a terminal and a base station, communication apparatus, and communication apparatus between a terminal and a base station provided in this disclosure are described in the foregoing in detail, and the principles and implementation manners of this application are described by applying specific examples in this text. The foregoing descriptions of the embodiments are merely to help understand the method of this application and the core ideas thereof. Meanwhile, for those of ordinary skill in the art, there may be modifications to the specific implementation manners and application scopes according to the idea of this application. Therefore, the content of the specification should not be construed as limiting this application.

What is claimed is:

1. A communication method performed by a relay device, the method comprising:
    receiving a first uplink data frame from a terminal, the first uplink data frame comprising information indicating a first period;
    determining a length of a first preamble according to the first period and a first time length, the first time length being equal to a length of a third preamble plus a second time length, wherein the determining of the length of the first preamble comprises:
    setting the length of the first preamble based on the determined length of the first preamble, wherein the length of the first preamble is set:
    to the length of the third preamble in response to the first period being determined to be greater than the first time length; and
    to a third time length equal to the first period minus the second time length in response to the first period being determined to be less than or equal to the first time length;
    sending a second downlink data frame to the terminal, the second downlink data frame comprising the first preamble; and
    receiving a first downlink data frame from a base station, the first downlink data frame comprising a second preamble, wherein a length of the second preamble is less than or equal to each of the length of the first preamble and the length of the third preamble.

2. The method according to claim 1, further comprising: acquiring a preset preamble as the third preamble.

3. The method according to claim 1, further comprising: receiving a first beacon frame from the base station, wherein the first beacon frame is configured for time calibration.

4. The method according to claim 1, wherein the first uplink data frame comprises a first mode identifier, and the method further comprises:
    determining, according to the first mode identifier, that the terminal operates in a first mode.

5. The method according to claim 1, further comprising:
    sending a second uplink data frame to the base station, the second uplink data frame comprising the second preamble;
    receiving a third downlink data frame from the base station; and
    sending the third downlink data frame to the terminal.

6. The method according to claim 1, wherein receiving the first uplink data frame from the terminal further comprises:
    waking up periodically from a dormant state according to a third period, and detecting whether a fourth preamble is received when the relay device wakes up according to the third period; and
    in response to detecting that the four preamble is received, receiving the first uplink data frame.

7. The method according to claim 1, wherein receiving the first downlink data frame from the base station further comprises:
    waking up periodically from the dormant state according to the first period, and receiving the first downlink data frame from the base station when the relay device wakes up according to the first period.

8. The method according to claim 5, wherein sending the second uplink data frame to the base station further comprises:
    determining whether the terminal is in a white list; and
    sending the second uplink data frame to the base station, in response to the terminal being determined to be in the white list.

9. The method according to claim 3, wherein receiving the first beacon frame from the base station comprises:
    waking the relay device up periodically from the dormant state according to a second period, and receiving the first beacon frame from the base station, when the relay device wakes up according to the second period.

10. The method according to claim 5, wherein
    receiving the third downlink data frame from the base station comprises: receiving, within a first reception window after receiving the first uplink data frame from the terminal, the third downlink data frame from the base station; and
    sending the third downlink data frame to the terminal comprises: sending the third downlink data frame to the terminal within a second reception window after receiving the first uplink data frame from the terminal.

11. A relay device, comprising:
at least one processor; and
a memory storing a set of instructions that is executable by the at least one processor to cause the relay device to perform:
  receiving a first uplink data frame from a terminal, the first uplink data frame comprising information indicating a first period;
  determining a length of a first preamble according to the first period and a first time length, the first time length being equal to a length of a third preamble plus a second time length, wherein the determining of the length of the first preamble comprises:
    in response to the first period being determined to be greater than the first time length, setting the length of the first preamble to be the length of the third preamble;
    in response to the first period being determined to be less than or equal to the first time length, setting the length of the first preamble to be a third time length, the third time length being equal to the first period minus the second time length;
  sending a second downlink data frame to the terminal, the second downlink data frame comprising the first preamble; and
  receiving a first downlink data frame from a base station, the first downlink data frame comprising a second preamble, wherein a length of the second preamble is less than or equal to each of the length of the first preamble and the length of the third preamble.

12. A non-transitory computer readable medium that stores a set of instructions that is executable by at least one processor of a relay device to cause the relay device to perform communication method, the method comprising:
  receiving a first uplink data frame from a terminal, the first uplink data frame comprising information indicating a first period;
  determining a length of a first preamble according to the first period and a first time length, the first time length being equal to a length of a third preamble plus a second time length, wherein the determining of the length of the first preamble comprises:
    in response to the first period being determined to be greater than the first time length, setting the length of the first preamble to be the length of the third preamble;
    in response to the first period being determined to be less than or equal to the first time length, setting the length of the first preamble to be a third time length, the third time length being equal to the first period minus the second time length;
  sending a second downlink data frame to the terminal, the second downlink data frame comprising the first preamble; and
  receiving a first downlink data frame from a base station, the first downlink data frame comprising a second preamble, wherein a length of the second preamble is less than or equal to each of the length of the first preamble and the length of the third preamble.

* * * * *